United States Patent
Chen et al.

(10) Patent No.: US 12,199,234 B2
(45) Date of Patent: Jan. 14, 2025

(54) METHOD FOR PRODUCING AN ELECTROLYTIC COPPER FOIL

(71) Applicant: NAN YA PLASTICS CORPORATION, Taipei (TW)

(72) Inventors: Chia-Ling Chen, Tainan (TW); Ming-Jen Tzou, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 18/097,573

(22) Filed: Jan. 17, 2023

(65) Prior Publication Data

US 2023/0155169 A1  May 18, 2023

Related U.S. Application Data

(62) Division of application No. 16/844,050, filed on Apr. 9, 2020, now Pat. No. 11,588,175.

(30) Foreign Application Priority Data

Apr. 30, 2019 (TW) .................. 108115077

(51) Int. Cl.
*H01M 10/0562* (2010.01)
*C25D 3/38* (2006.01)
(Continued)

(52) U.S. Cl.
CPC .......... *H01M 10/0562* (2013.01); *C25D 3/38* (2013.01); *H01M 4/0438* (2013.01);
(Continued)

(58) Field of Classification Search
CPC ......... H01M 10/0562; H01M 10/0525; H01M 4/04; H01M 4/0438; H01M 4/0471; C25D 3/38
See application file for complete search history.

(56) References Cited

U.S. PATENT DOCUMENTS 6,319,621 B1  11/2001  Arai et al.
2009/0061326 A1  3/2009  Hirose et al.
(Continued)

FOREIGN PATENT DOCUMENTS

| CN | 101436658 A | 5/2009 |
| CN | 105316630 A | 2/2016 |

(Continued)

*Primary Examiner* — Kenneth J Douyette
(74) *Attorney, Agent, or Firm* — Li & Cai Intellectual Property (USA) Office

(57) ABSTRACT

A method for producing an electrolytic copper foil is provided. The method includes preparing a copper electrolytic solution including at least one addition agent and performing an electroplating step including: electrolyzing the copper electrolytic solution to form a raw foil layer. The raw foil layer has a first surface and a second surface opposite to the first surface. In the X-ray diffraction spectrum of the first surface, a ratio of the diffraction peak intensity I(200) of the (200) crystal face of the first surface relative to the diffraction peak intensity I(111) of the (111) crystal face of the first surface is between 0.5 and 2.0. A ratio of the diffraction peak intensity I(200) of the (200) crystal face of the second surface relative to the diffraction peak intensity I(111) of the (111) crystal face of the second surface is between 0.5 and 2.0.

5 Claims, 4 Drawing Sheets

(51) Int. Cl.
    *H01M 4/04*      (2006.01)
    *H01M 10/0525*   (2010.01)
(52) U.S. Cl.
    CPC ......... *H01M 4/045* (2013.01); *H01M 4/0471* (2013.01); *H01M 10/0525* (2013.01)

(56)         References Cited

U.S. PATENT DOCUMENTS

| | | | |
|---|---|---|---|
| 2010/0136434 A1* | 6/2010 | Hanafusa | .................. C22F 1/08 148/432 |
| 2010/0167129 A1 | 7/2010 | Wu et al. | |
| 2014/0199588 A1 | 7/2014 | Shinozaki et al. | |
| 2018/0102545 A1* | 4/2018 | Kim | ...................... H01M 4/661 |

FOREIGN PATENT DOCUMENTS

| | | | |
|---|---|---|---|
| JP | 9306504 | A | 11/1997 |
| JP | 2002322586 | A | 11/2002 |
| JP | 2004263300 | A | 9/2004 |
| JP | 2006299320 | A | 11/2006 |
| JP | 200813847 | A | 1/2008 |
| JP | 2013133514 | A | 7/2013 |
| JP | 2016537514 | A | 12/2016 |
| JP | 201814332 | A | 1/2018 |
| JP | 2018141230 | A | 9/2018 |
| KR | 1020150041577 | A | 4/2015 |
| KR | 1020180080512 | A | 7/2018 |
| TW | 201428112 | A | 7/2014 |
| WO | WO 2018047933 | A1 | 3/2018 |

\* cited by examiner

METHOD FOR PRODUCING AN ELECTROLYTIC COPPER FOIL

CROSS-REFERENCE TO RELATED PATENT APPLICATION

This application is a divisional application of the U.S. application Ser. No. 16/844,050, now U.S. Pat. No. 11,558,175, filed on Apr. 9, 2020 and entitled "ELECTROLYTIC COPPER FOIL", now pending, the entire disclosures of which are incorporated herein by reference. Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for producing an electrolytic copper foil, and more particularly to a method for producing an electrolytic copper foil having high elongation.

BACKGROUND OF THE DISCLOSURE

Conventional electrolytic copper foils can be used to manufacture various products such as a negative electrode of a lithium ion secondary battery. In general, in a process of manufacturing an electrolytic copper foil, an electrolytic copper foil having a large-sized crystal structure can be produced by using a high concentration of additive in an electrolytic solution. This kind of electrolytic copper foil generally has high elongation. In an X-ray diffraction spectrum (XRD spectrum) of this kind of electrolytic copper foil, a diffraction peak intensity $I(111)$ of a (111) crystal face is high. Both a diffraction peak intensity $I(200)$ of a (200) crystal face and a diffraction peak intensity $I(220)$ of a (220) crystal face are lower than $I(111)$. Moreover, a ratio of $I(200)/I(111)$ is usually less than 0.5.

Although an electrolytic copper foil having high elongation can be produced by using a high concentration of additive in an electrolytic solution, it may result in problems of high production cost and process conditions that cannot be easily controlled.

Accordingly, the present disclosure provides a solution which can effectively improve on the above problems.

SUMMARY OF THE DISCLOSURE

In response to the above-referenced technical inadequacies, the present disclosure provides an electrolytic copper foil, a method for producing the same, and a lithium ion secondary battery to solve the existing problem that producing high elongation copper foil need to use a high concentration of additive.

In one aspect, the present disclosure provides an electrolytic copper foil which includes a raw foil layer. The raw foil layer has a first surface and a second surface opposite to the first surface. In an X-ray diffraction spectrum of the first surface, a ratio of a diffraction peak intensity $I(200)$ of a (200) crystal face of the first surface relative to a diffraction peak intensity $I(111)$ of a (111) crystal face of the first surface is between 0.5 and 2.0. In an X-ray diffraction spectrum of the second surface, a ratio of a diffraction peak intensity $I(200)$ of a (200) crystal face of the second surface relative to a diffraction peak intensity $I(111)$ of a (111) crystal face of the second surface is also between 0.5 and 2.0.

In one aspect, the present disclosure provides a method for producing an electrolytic copper foil which includes: preparing a copper electrolytic solution including at least one addition agent, in which based on a total weight of the copper electrolytic solution, a concentration of the at least one addition agent is not more than 12 ppm; and performing an electroplating step including: electrolyzing the copper electrolytic solution to form a raw foil layer; in which the raw foil layer has a first surface and a second surface opposite to the first surface. In an X-ray diffraction spectrum of the first surface, a ratio of a diffraction peak intensity $I(200)$ of a (200) crystal face of the first surface relative to a diffraction peak intensity $I(111)$ of a (111) crystal face of the first surface is between 0.5 and 2.0. In an X-ray diffraction spectrum of the second surface, a ratio of a diffraction peak intensity $I(200)$ of a (200) crystal face of the second surface relative to a diffraction peak intensity $I(111)$ of a (111) crystal face of the second surface is also between 0.5 and 2.0.

In one aspect, the present disclosure provides a lithium ion secondary battery which includes an electrolytic tank, a positive electrode, a negative electrode, and an isolation film. The electrolytic tank has an accommodating space for accommodating an electrolytic solution. The positive electrode is disposed in the accommodating space of the electrolytic tank. The negative electrode is disposed in the accommodating space of the electrolytic tank and spaced apart from the positive electrode; in which the negative electrode includes an electrolytic copper foil, and the electrolytic copper foil has a first surface and a second surface opposite to the first surface. The isolation film is disposed between the positive electrode and the negative electrode. In the X-ray diffraction spectrum of the first surface of the electrolytic copper foil, a ratio of a diffraction peak intensity $I(200)$ of a (200) crystal face of the first surface relative to a diffraction peak intensity $I(111)$ of a (111) crystal face of the first surface is between 0.5 and 2.0. In an X-ray diffraction spectrum of the second surface of the electrolytic copper foil, a ratio of a diffraction peak intensity $I(200)$ of a (200) crystal face of the second surface relative to a diffraction peak intensity $I(111)$ of a (111) crystal face of the second surface is also between 0.5 and 2.0.

Therefore, the electrolytic copper foil of the present disclosure can have high elongation, low production cost, and high production stability through the technical features of "in the X-ray diffraction spectrum of the first surface of the electrolytic copper foil, a ratio of the diffraction peak intensity $I(200)$ of the (200) crystal face of the first surface relative to the diffraction peak intensity $I(111)$ of the (111) crystal face of the first surface is between 0.5 and 2.0", "in the X-ray diffraction spectrum of the second surface of the electrolytic copper foil, a ratio of the diffraction peak intensity $I(200)$ of the (200) crystal face of the second surface relative to the diffraction peak intensity $I(111)$ of the (111) crystal face of the second surface is also between 0.5 and 2.0", "a copper electrolytic solution includes at least one addition agent", and "based on the total weight of the copper electrolytic solution, a concentration of the at least one addition agent is not more than 12 ppm".

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
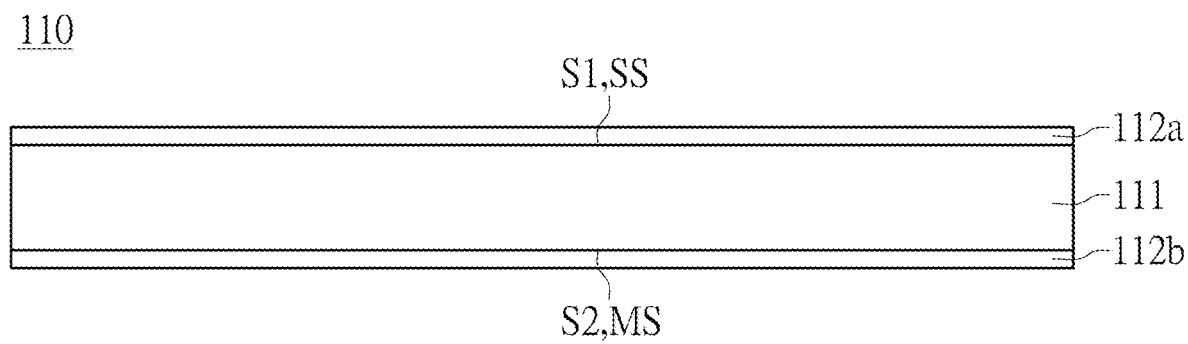
FIG. 1 is a side elevational view of an electrolytic copper foil according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Electrolytic Copper Foil

Referring to FIG. 1, a side elevational view of an electrolytic copper foil 110 according to an embodiment of the present disclosure is illustrated. The electrolytic copper foil 110 of the present embodiment is preferably applicable to a lithium ion secondary battery, and can be used as a material of a negative electrode of the lithium ion secondary battery. The electrolytic copper foil 110 of the present embodiment includes a raw foil layer 111, a first oxidation resistant layer 112a, and a second oxidation resistant layer 112b. The raw foil layer 111 has a first surface S1 and a second surface S2 opposite to the first surface S1. The first oxidation resistant layer 112a is disposed on the first surface S1, and the second oxidation resistant layer 112b is disposed on the second surface S2. That is, the first oxidation resistant layer 112a and the second oxidation resistant layer 112b are respectively disposed on two opposite surfaces of the raw foil layer 111, thereby improving an oxidation resistance of the electrolytic copper foil 110, but the present disclosure is not limited thereto. For example, in an embodiment that is not shown in the drawings, the electrolytic copper foil 110 may include only the raw foil layer 111, and does not include the first oxidation resistant layer 112a and the second oxidation resistant layer 112b.

More specifically, in the present embodiment, a distance between the first surface S1 and the second surface S2 may be defined as a thickness of the electrolytic copper foil 110. In an alternative embodiment, the thickness of the electrolytic copper foil 110 may be the total thickness of the raw foil layer 111 and the first and second oxidation resistant layers 112a, 112b. Further, in order to enable the electrolytic copper foil 110 to be applied to a lithium ion secondary battery, the thickness of the electrolytic copper foil 110 is preferably between 2 micrometers (μm) and 20 micrometers, but the present disclosure is not limited thereto.

Figure 2:
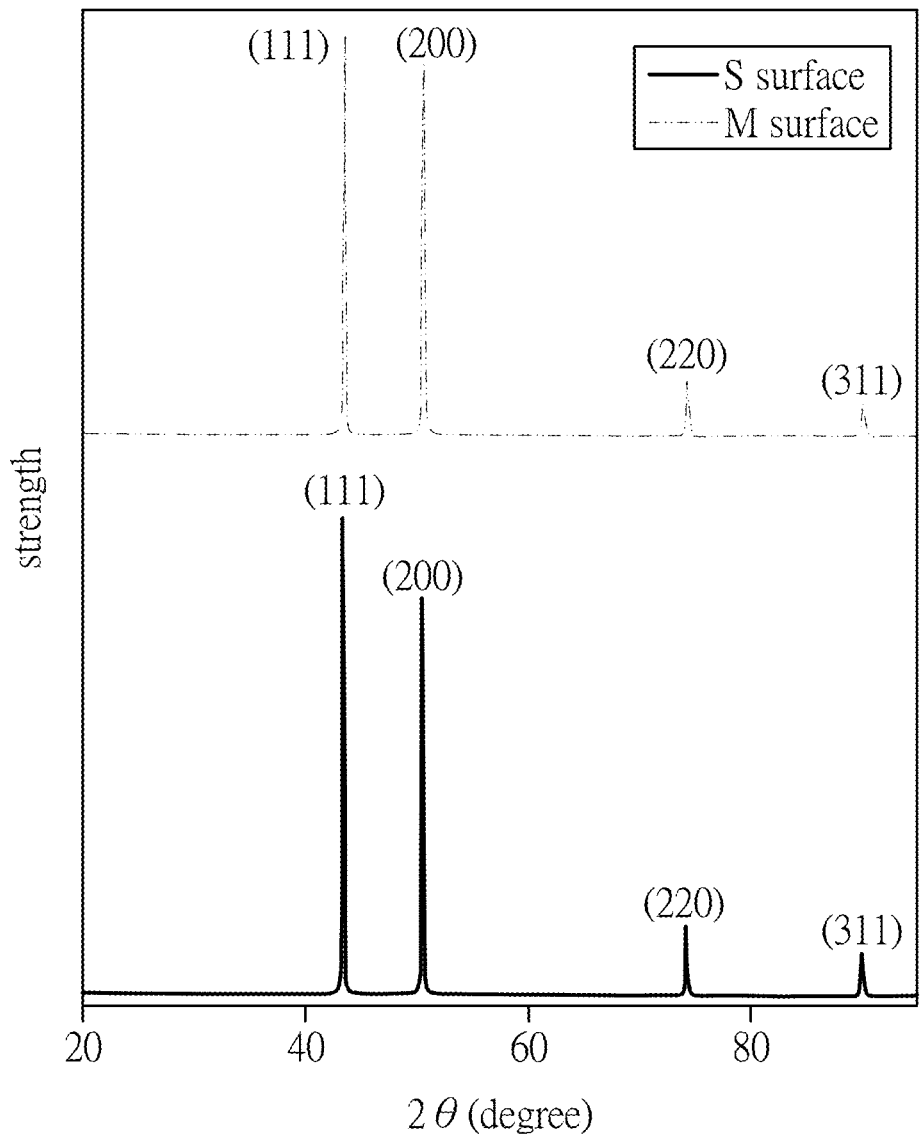
FIG. 2 is an X-ray diffraction spectrum of the electrolytic copper foil according to the embodiment of the present disclosure.

Referring to FIG. 2, an X-ray diffraction spectrum of the electrolytic copper foil according to the embodiment of the present disclosure is shown. More specifically, FIG. 2 shows that in the X-ray diffraction spectrum of two surfaces (S surface and M surface) of the electrolytic copper foil 110, a diffraction peak intensity I(111) of a (111) crystal face is at a diffraction angle (2θ) of 43.0°±1.0°, a diffraction peak intensity I(200) of a (200) crystal face is at a diffraction angle (2θ) of 50.5°±1.0°, and a ratio of I(200)/I(111) is known to be in a range from approximately 0.5 to approximately 2.0.

More specifically, in the present embodiment, in an X-ray diffraction spectrum of the first surface S1 of the electrolytic copper foil 110, a ratio of a diffraction peak intensity I(200) of a (200) crystal face of the first surface S1 relative to a diffraction peak intensity I(111) of a (111) crystal face of the first surface S1 is between 0.5 and 2.0. In addition, in an X-ray diffraction spectrum of the second surface S2 of the electrolytic copper foil 110, a ratio of a diffraction peak intensity I(200) of the (200) crystal face of the second surface S2 relative to a diffraction peak intensity I(111) of the (111) crystal face of the second surface S2 is also between 0.5 and 2.0.

That is, regardless of the X-ray diffraction spectrum of the first surface S1 or the second surface S2, the ratio of I(200)/I(111) is not less than 0.5 and not more than 2.0.

Further referring to FIG. 1, each of the first oxidation resistant layer 112a and the second oxidation resistant layer 112b has a thickness not more than 50 nanometers (nm). In addition, each of the first oxidation resistant layer 112a and the second oxidation resistant layer 112b includes a non-copper metal element. Further, based on a total weight of the electrolytic copper foil 110, each of the first oxidation resistant layer 112a and the second oxidation resistant layer 112b includes the non-copper metal element in an amount ranging from 1 ppm (parts per million) to 1,000 ppm, and the non-copper metal element is at least one element selected from the group consisting of chromium, zinc, nickel, molybdenum, manganese, phosphorus, and combinations thereof.

According to the structural and material design of the above-mentioned electrolytic copper foil 110, the electrolytic copper foil 110 can have good tensile strength and elongation. More specifically, without heat treatment step, the electrolytic copper foil 110 has a tensile strength between 28 kgf/mm² and 40 kgf/mm² and an elongation (i.e., extensibility) not less than 7% in a room temperature environment (e.g., 20° C. to 30° C.). In addition, after the heat treatment step, the electrolytic copper foil 110 has a tensile strength between 25 kgf/mm² and 35 kgf/mm² and an elongation not less than 9.5%. The heat treatment step includes: baking the electrolytic copper foil at a temperature between 130° C. and 250° C. for 0.5 hours to 1.5 hours. Preferably, the heat treatment step includes: baking the electrolytic copper foil at a temperature of 180° C. for 1.0 hour.

In other words, in the present embodiment, a tensile strength of the electrolytic copper foil 110 that is treated by the heat treatment step is between 65% and 95% of a tensile strength of the electrolytic copper foil 110 that is not treated by the heat treatment step, and an elongation of the electrolytic copper foil 110 that is treated by the heat treatment step is between 100% and 140% of an elongation of the electrolytic copper foil 110 that is not treated by the heat treatment step.

Figure 3:
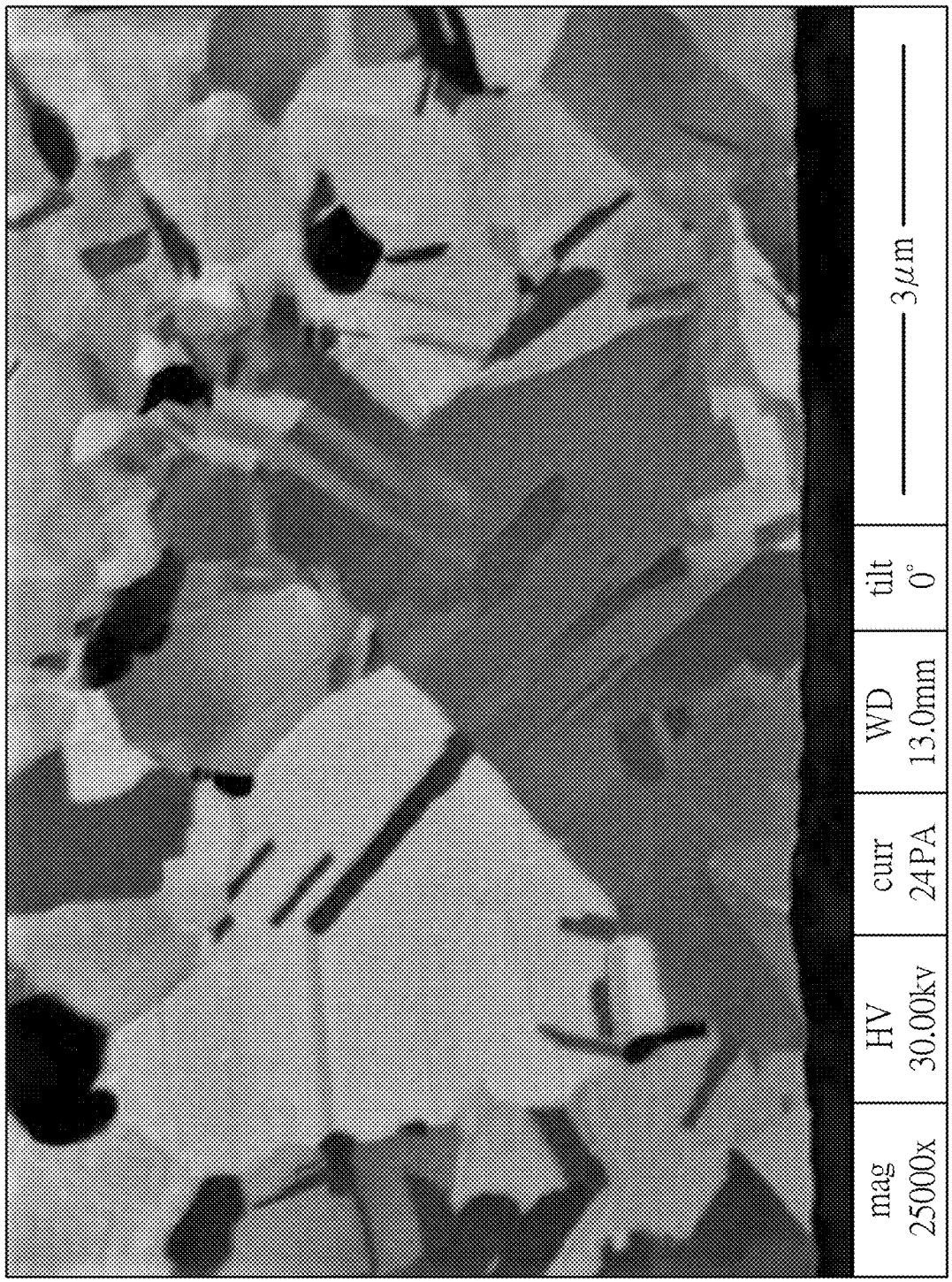
FIG. 3 is a focused ion beam (FIB) image of the electrolytic copper foil according to the embodiment of the present disclosure.

Referring to FIG. 3, a focused ion beam (FIB) image of the electrolytic copper foil according to the embodiment of the present disclosure is shown. The electrolytic copper foil 110 has a plurality of crystal grains (not labeled) distributed between the first surface S1 and the second surface S2. Before the heat treatment step, each crystal grain has a grain size between 20 nm and 45 nm, and preferably between 21.5 nm and 40.5 nm, but the present disclosure is not limited thereto. It is worth mentioning that the above-mentioned grain size is calculated by using a full width at half maximum (FWHM) of the X-ray diffraction (XRD) spectrum.

In addition, in the present embodiment, a grain size of each crystal grain of the electrolytic copper foil 110 that is treated by the heat treatment step is between 90% and 130% of a grain size of each crystal grain of the electrolytic copper foil 110 that is not treated by the heat treatment step, and is preferably between 95% and 120%. That is, according to the design of the above-mentioned electrolytic copper foil 110, the electrolytic copper foil 110 can maintain a bulk crystal structure having large-sized crystal grains regardless of whether or not the heat treatment step is performed, thereby having high elongation.

Further referring to FIG. 2, in the X-ray diffraction (XRD) spectrum of the electrolytic copper foil 110 of the present embodiment, the ratio of I(200) to I(111) of each of the two surfaces of the electrolytic copper foil 110 is between 0.5 and 2.0. That is, the diffraction peak intensity I(200) of the (200) crystal face of the electrolytic copper foil 110 is close to the diffraction peak intensity I(111) of the (111) crystal face of the electrolytic copper foil 110. In addition, as shown in FIG. 2, both the diffraction peak intensity I(200) of the (200) crystal face and the diffraction peak intensity I(111) of the (111) crystal face are much higher than the diffraction peak intensity I(220) of the (220) crystal face.

Further, since the crystal orientations of the electrolytic copper foil 110 of the present embodiment are mainly the (200) crystal face and the (111) crystal face, a slip phenomenon between the plurality of crystal grains in the electrolytic copper foil 110 is likely to occur. Therefore, the electrolytic copper foil 110 has high elongation. In other words, since the crystal structure of the electrolytic copper foil 110 of the present embodiment is a bulk crystal structure, the electrolytic copper foil 110 has high elongation.

Method for Producing Electrolytic Copper Foil

The description of the structure and materials of the electrolytic copper foil 110 of the present embodiment is as described above, and a method for producing the electrolytic copper foil 110 will be described in detail below according to an embodiment of the present disclosure.

The present embodiment provides a method for producing the electrolytic copper foil. The method for producing the electrolytic copper foil includes step S110, step S120, and step S130. It should be noted that an order of the steps and actual operations of the present embodiment may be adjusted according to requirements, and is not limited to the present embodiment.

Step S110 includes: preparing a copper electrolytic solution. The copper electrolytic solution includes at least one addition agent. Based on a total weight of the copper electrolytic solution, a concentration of the at least one addition agent is not more than 12 ppm.

More specifically, in addition to the above addition agent, the copper electrolytic solution further includes copper ions ($Cu^{2+}$), chloride ions ($Cl^-$), and sulfuric acid. Further, in the copper electrolytic solution, a concentration of the copper ions preferably ranges from 30 g/L to 90 g/L, and more preferably ranges from 50 g/L to 70 g/L. A concentration of the sulfuric acid preferably ranges from 50 g/L to 140 g/L, and more preferably ranges from 70 g/L to 120 g/L. A concentration of the chloride ions is preferably ranges from 10 ppm to 50 ppm, and more preferably ranges from 10 ppm to 30 ppm. Further, in the present embodiment, a source of the copper ions is copper sulfate, and a source of the chloride ions is hydrochloric acid, but the present disclosure is not limited thereto.

More specifically, in the present embodiment, the at least one addition agent includes a first addition agent, a second addition agent, and a third addition agent.

The first addition agent is a gelatin and is preferably an industrial grade electroplating gelatin. In the copper electrolytic solution, a concentration of the first addition agent is preferably not more than 5 ppm. In addition, a weight average molecular weight of the gelatin is preferably between 1,000 and 5,000, and more preferably between 2,000 and 4,000. Further, the gelatin may be at least one component selected from the group consisting of pig gelatin, bovine gelatin, and fish gelatin. In the present embodiment, the first addition agent is preferably pig gelatin, but the present disclosure is not limited thereto.

The second addition agent is sulfonic acid or sulfonate which has a sulfur compound. In the copper electrolytic solution, the concentration of the second addition agent is preferably not more than 2 ppm.

Further, the second addition agent may be at least one component selected from the group consisting of bis-(3-sulfopropyl)-disulfide disodium salt (SPS), 3-mercapto-1-propanesulfonic acid (MPS), 3-(N,N-dimethylthiocarbamoyl)-thiopropanesulfonate sodium salt (DPS), 3-[(amino-iminomethyl)thio]-1-propanesulfonate sodium salt (UPS), o-ethyldithiocarbonato-S-(3-sulfopropyl)-ester sodium salt (OPX), 3-(benzothiazolyl-2-mercapto)-propyl-sulfonic acid sodium salt (ZPS), ethylenedithiodipropylsulfonic acid sodium salt, thioglycolic acid, thiophosphoric acid-o-ethyl-bis-(ω-sulfopropyl)ester disodium salt, and thiophosphoric acid-tris-(ω-sulfopropyl)ester trisodium salt.

In the present embodiment, the second addition agent is preferably 3-mercapto-1-propanesulfonic acid (MPS), but the present disclosure is not limited thereto.

The third addition agent is a nonionic water soluble polymer. In the copper electrolytic solution, a concentration of the third addition agent is preferably not more than 5 ppm.

Further, the third addition agent may be at least one component selected from the group consisting of hydroxyethyl cellulose (HEC), poly(ethylene oxide) (PEG), polyglycerin, carboxymethylcellulose, nonylphenol polyglycol ether, octane diol-bis-(polyalkylene glycol ether), octanol polyalkylene glycol ether, leic acid polyglycol ether, polyethylene propylene glycol, polyethylene glycol dimethyl ether, polyoxypropylene glycol, ß-naphthol polyglycol ether, stearic acid polyglycol ether, and stearyl alcohol polyglycol ether.

In the present embodiment, the third addition agent is preferably hydroxyethyl cellulose (HEC), but the present disclosure is not limited thereto.

Moreover, based on the total weight of the copper electrolytic solution, the sum of the concentrations of the first addition agent, the second addition agent, and the third addition agent is not more than 12 ppm, and more preferably not more than 10 ppm. It should be noted that the above various addition agents are mainly used for improving the surface glossiness of the electrolytic copper foil 110 and reducing a surface roughness of the electrolytic copper foil 110.

Step S120 includes: performing an electroplating step. The electroplating step includes: electrolyzing the copper electrolytic solution to form a raw foil layer 111.

More specifically, the electroplating step includes: heating the copper electrolytic solution to a predetermined temperature, in which the predetermined temperature is between 50° C. and 60° C., and more preferably between 50° C. and 55° C.; and then forming a current density of 30 A/dm$^2$ to 80 A/dm$^2$ between an electrode plate and a rotating electrode drum in the copper electrolytic solution at the predetermined temperature to form the raw foil layer 111 on the rotating electrode drum.

As described in the above embodiment, the raw foil layer 111 has a first surface S1 and a second surface S2 opposite to the first surface S1. In the X-ray diffraction spectrum of the first surface S1, a ratio of the diffraction peak intensity I(200) of the (200) crystal face of the first surface S1 relative to the diffraction peak intensity I(111) of the (111) crystal face of the first surface S1 is between 0.5 and 2.0. In addition, in the X-ray diffraction spectrum of the second surface S2, a ratio of the diffraction peak intensity I(200) of the (200) crystal face of the second surface S2 relative to the diffraction peak intensity I(111) of the (111) crystal face of the second surface S2 is also between 0.5 and 2.0.

Based on the above process conditions, such as a selection of addition agent, a selection of gelatin molecular weight, an adjustment of addition agent concentration (not more than 12 ppm), an adjustment of chloride ion concentration, and an adjustment of copper electrolytic solution temperature, the crystal orientations of the electrolytic copper foil 110 of the present embodiment are mainly the (200) crystal face and the (111) crystal face. Accordingly, a slip phenomenon between the plurality of crystal grains in the electrolytic copper foil 110 is likely to occur, so that the electrolytic copper foil 110 has high elongation. In other words, the electrolytic copper foil 110 of the present embodiment can still have good elongation at a low addition agent concentration by the above-described process conditions, thereby greatly reducing a cost of usage of the addition agent and greatly improving the poor production process problem.

Further, in the present embodiment, the first surface S1 of the raw foil layer 111 is a smooth surface SS that is in contact with a rotating electrode drum during a plating process and is defined as an S surface. The second surface S2 of the raw foil layer 111 is another smooth surface MS that is opposite to the smooth surface SS (S surface) and is defined as an M surface.

In the X-ray diffraction spectrum of the S surface, a ratio of the diffraction peak intensity I(200) of the (200) crystal face of the S surface relative to the diffraction peak intensity I(111) of the (111) crystal face of the S surface is defined as a first diffraction peak intensity ratio. In the X-ray diffraction spectrum of the M surface, a ratio of the diffraction peak intensity I(200) of the (200) crystal face of the M surface relative to the diffraction peak intensity I(111) of the (111) crystal face of the M surface is defined as a second diffraction peak intensity ratio.

In the present embodiment, the first diffraction peak intensity ratio is less than the second diffraction peak intensity ratio. Preferably, an absolute value of the difference between the first diffraction peak intensity ratio and the second diffraction peak intensity ratio is not less than 0.01 and not more than 0.30. Relevant analytical contents are shown in Table 1 and Table 2 below.

Step S130 includes: performing an anti-oxidation treatment step which includes: forming a first oxidation resistant layer 112a on the first surface S1 of the raw foil layer 111, and forming a second oxidation resistant layer 112b on the second surface S2 of the raw foil layer 111, so that the raw foil layer 111, the first oxidation resistant layer 112a, and the second oxidation resistant layer 112b are collectively formed into an electrolytic copper foil 110. Further, based on the total weight of the electrolytic copper foil 110, each of the first oxidation resistant layer 112a and the second oxidation resistant layer 112b includes a non-copper metal element in an amount ranging from 1 ppm to 1,000 ppm. The non-copper metal element is at least one element selected from the group consisting of chromium, zinc, nickel, molybdenum, manganese, phosphorus, and combinations thereof.

More specifically, the anti-oxidation treatment step includes: electroplating or impregnating the raw foil layer 111 with a treatment solution including the non-copper metal element (i.e. at least one of chromium, zinc, nickel, molybdenum, manganese, and phosphorus), so that the first oxidation resistant layer 112a is formed on the first surface S1 of the raw foil layer 111, and the second oxidation resistant layer 112b is formed on the second surface S2 of the raw foil layer 111. Accordingly, the oxidation resistance of the electrolytic copper foil 110 can be effectively improved. In the present embodiment, the treatment solution includes 0.1 g/L to 5.0 g/L of chromium oxide, zinc sulfate, nickel sulfate, sodium molybdate, manganese sulfate, or phosphoric acid. The current density of the electroplating treatment is between 0.3 A/dm$^2$ and 3.0 A/dm$^2$. Furthermore, an impregnation treatment time is between 2 seconds and 20 seconds, but the present disclosure is not limited thereto.

Experimental Results

Hereinafter, the contents of the present disclosure will be described in detail with reference to exemplary examples 1 to 5 and comparative examples 1 to 3. However, the following examples are merely examples to help with the understanding of the present disclosure, and the scope of protection of the present disclosure is not limited to the examples.

The raw foil layer is prepared by generating a current between an electrode plate and a rotating electrode drum in a copper electrolytic solution, so that the raw foil layer is formed on the rotating electrode drum. The copper electrolytic solution includes 50 g/L to 70 g/L of copper ions and 70 g/L to 120 g/L of sulfuric acid. The current density of the electroplating ranges from 30 A/dm$^2$ to 80 A/dm$^2$. Process conditions such as copper electrolytic solution temperature (abbrev. solution temp.), chloride ion concentration (abbrev. chloride ion conc.), gelatin weight average molecular weight (abbrev. gelatin WAMW), gelatin concentration (first addition agent concentration; abbrev. gelatin conc.), MPS concentration (second addition agent concentration; abbrev. MPS conc.), and HEC concentration (third addition agent concentration; abbrev. HEC conc.) are shown in Table 1 below. The raw foil layer is formed by immersion and electroplating, the oxidation resistant layer is formed by an oxidation treatment, and then the electrolytic copper foil is completed after drying.

It is worth mentioning that in the first to fifth exemplary examples, based on the total weight of the copper electrolytic solution, a sum of the gelatin concentration (first addition agent concentration), the MPS concentration (second addition agent concentration), and the HEC concentration (third addition agent) is not more than 12 ppm, and more preferably not more than 10 ppm.

TABLE 1 process parameters of the exemplary and comparative examples

| items | solution temp. (° C.) | chloride ion conc. (ppm) | gelatin WAMW | gelatin conc. (ppm) | MPS conc. (ppm) | HEC conc. (ppm) |
|---|---|---|---|---|---|---|
| exemplary example 1 | 50 | 30 | 2,000 | 4.0 | 0.9 | 4.0 |
| exemplary example 2 | 53 | 30 | 2,000 | 4.0 | 0.5 | 4.0 |
| exemplary example 3 | 53 | 13 | 4,000 | 3.0 | 0.2 | 3.0 |
| exemplary example 4 | 53 | 13 | 4,000 | 1.0 | 0.5 | 0.5 |
| exemplary example 5 | 53 | 13 | 4,000 | 1.0 | 0.4 | 2.0 |
| comparative example 1 | 53 | 30 | 4,000 | 70.0 | 10.0 | 20.0 |
| comparative example 2 | 53 | 13 | 4,000 | 70.0 | 10.0 | 20.0 |
| comparative example 3 | 58 | 30 | >10,000 | 4.0 | 1.0 | 4.0 |

The electrolytic copper foils obtained in the exemplary examples 1 to 5 and the comparative examples 1 to 3 were tested. More specifically, the first surface (i.e. a smooth surface that contact with a rotating electrode drum and defined as an S surface) and the second surface (i.e. another smooth surface that is opposite to the S surface and defined as an M surface) of each of the electrolytic copper foils were tested before and after a heat treatment step, respectively, to obtain relevant characteristic values. The relevant characteristic values include: an XRD analysis, a tensile strength, and elongation. Test results are shown in Table 2 below. In addition, the heat treatment step includes: baking the electrolytic copper foil at a temperature of 180° C. for 1.0 hour.

The XRD analysis includes: measuring an X-ray diffraction (XRD) spectrum (as shown in FIG. 2) of the S surface or the M surface of each of the electrolytic copper foils obtained in the exemplary examples 1 to 5 and the comparative examples 1 to 3, whereby the ratio of I(200)/I(111) and the ratio of (I220)/(I111) can be calculated. More specifically, the XRD analysis of the electrolytic copper foil was carried out by using a Bruker D2Phaser machine, and the XRD analysis was performed by X-ray diffraction at a diffraction angle of 20° to 95° [target: copper K α1, 2θ interval: 0.01°, and 2θ scan rate: 0.13°/min] to obtain an XRD spectrum with peaks corresponding to n crystal faces (i.e. an XRD spectrum corresponding to the peaks of the crystal faces (111), (200), (220), and (311)). An XRD diffraction (light) intensity [I(hkl)] of each of the crystal faces (hkl) was obtained from the XRD spectrum. Therefore, the ratio of I(200)/I(111) and the ratio of I(220)/I(111) can be calculated.

Measurements of the tensile strength and elongation include: treating the electrolytic copper foils obtained in the exemplary examples 1 to 5 and the comparative examples 1 to 3. Each of the electrolytic copper foils was subjected to a tensile test at a crosshead velocity of 50.8 mm/min according to the IPC-TM-650 2.4.18B standard. A maximum load of tensile strength is called room temperature tensile strength (RTS), and the elongation at the breaking point is called room temperature elongation (REL). The room temperature herein is a temperature between 20° C. and 30° C. Next, the same electrolytic copper foil for measuring the tensile strength and the elongation at the room temperature was subjected to a heat treatment at 180° C. for 1 hour, and then the tensile strength and elongation were measured in the same manner at room temperature. The measured tensile strength and elongation are referred to as tensile strength after heat treatment (ATS) and elongation after heat treatment (AEL).

TABLE 2 experimental results of the exemplary and comparative examples

| items | | exemplary example 1 | exemplary example 2 | exemplary example 3 | exemplary example 4 | exemplary example 5 |
|---|---|---|---|---|---|---|
| I(200)/I(111) | S surface before heat treatment | 0.58 | 0.67 | 0.52 | 0.86 | 0.83 |
| | M surface before heat | 0.72 | 0.81 | 0.58 | 1.08 | 0.93 |

TABLE 2-continued experimental results of the exemplary and comparative examples

| items | | | | | | |
|---|---|---|---|---|---|---|
| | S surface after heat treatment | 0.71 | 0.71 | 0.60 | 1.17 | 0.90 |
| | M surface after heat treatment | 0.75 | 0.79 | 0.67 | 1.29 | 0.95 |
| I(220)/I(111) | S surface before heat treatment | 0.15 | 0.15 | 0.13 | 0.15 | 0.14 |
| | M surface before heat treatment | 0.16 | 0.16 | 0.14 | 0.15 | 0.14 |
| | S surface after heat treatment | 0.18 | 0.15 | 0.14 | 0.18 | 0.14 |
| | M surface after heat treatment | 0.14 | 0.14 | 0.16 | 0.16 | 0.13 |
| RTS(kgf/mm$^2$) | | 32.2 | 33.7 | 33.5 | 34.2 | 34.4 |
| REL(%) | | 8.3 | 9.7 | 8.9 | 7.9 | 9.2 |
| ATS(kgf/mm$^2$) | | 31.1 | 30.7 | 29.6 | 29.7 | 30.8 |
| AEL(%) | | 15.0 | 11.9 | 10.1 | 9.7 | 13.4 |

| items | | comparative example 1 | comparative example 2 | comparative example 3 |
|---|---|---|---|---|
| I(200)/I(111) | S surface before heat treatment | 0.25 | 0.24 | 0.25 |
| | M surface before heat treatment | 0.25 | 0.24 | 0.20 |
| | S surface after heat treatment | 0.29 | 0.26 | 0.32 |
| | M surface after heat treatment | 0.24 | 0.23 | 0.30 |
| I(220)/I(111) | S surface before heat treatment | 0.14 | 0.33 | 0.15 |
| | M surface before heat treatment | 0.17 | 0.19 | 0.21 |
| | S surface after heat treatment | 0.20 | 0.30 | 0.16 |
| | M surface after heat treatment | 0.27 | 0.17 | 0.20 |
| RTS(kgf/mm$^2$) | | 32.4 | 31.8 | 39.4 |
| REL(%) | | 5.8 | 5.1 | 3.0 |
| ATS(kgf/mm$^2$) | | 32.2 | 29.0 | 29.6 |
| AEL(%) | | 9.2 | 8.9 | 4.0 |

As shown in Table 2, in the electrolytic copper foils of the exemplary examples 1 to 5, the ratios of I(200)/I(111) by the XRD analysis were approximately within the range of 0.5 to 2.0, and more precisely within the range of 0.52 to 1.29. In the electrolytic copper foils of the comparative examples 1 to 3, the ratios of I(200)/I(111) by the XRD analysis were all less than 0.5, and more precisely within the range of 0.2 to 0.33. In other words, the ratios of I(200)/I(111) of the electrolytic copper foils of the exemplary examples 1 to 5 were much higher than the ratios of I(200)/I(111) of the electrolytic copper foils of the comparative examples 1 to 3.

From another point of view, in each of the electrolytic copper foils of the exemplary examples 1 to 5, the ratio of I(200)/I(111) of the S surface of the electrolytic copper foil before the heat treatment is lower than the ratio of I(200)/I(111) of the M surface thereof. Further, the ratio of I(200)/I(111) of the S surface of the electrolytic copper foil after the heat treatment is also lower than the ratio of I(200)/I(111) of the M surface thereof, but a difference between the ratios of I(200)/I(111) of the S surface and the M surface tends to decrease after the heat treatment.

In addition, in the exemplary examples 1 to 5, regardless of the S surface or the M surface, the ratios of I(200)/I(111) before the heat treatment are mostly lower than the ratios of I(200)/I(111) after the heat treatment. That is, the heat treatment will cause the ratios of I(200)/I(111) of the electrolytic copper foils to be slightly increased.

More specifically, in the electrolytic copper foils of the exemplary examples 1 to 5, the ratios of I(200)/I(111) of the S surfaces before the heat treatment are within the range of 0.52 to 0.86, and the ratios of I(200)/I(111) of the S surfaces after the heat treatment are within the range of 0.60 to 1.17. Moreover, the ratios of I(200)/I(111) of the M surfaces before the heat treatment are within the range of 0.58 to 1.08, and the ratios of I(200)/I(111) of the M surfaces after the heat treatment are within the range of 0.67 to 1.29.

The ratio of I(200)/I(111) of the S surface (smooth surface) can be defined as a first diffraction peak intensity ratio, and the ratio of I(200)/I(111) of the M surface (another smooth surface) can be defined as a second diffraction peak intensity ratio. Further, in each of the electrolytic copper foils of the exemplary examples 1 to 5, the first diffraction peak intensity ratio is less than the second diffraction peak intensity ratio. In addition, an absolute value of the difference between the first diffraction peak intensity ratio and the second diffraction peak intensity ratio is not less than 0.01 and not more than 0.30. As shown in table 2, before the heat treatment, each of the electrolytic copper foils of the exemplary examples 1 to 5 has a room temperature tensile strength (RTS) between 28 kgf/mm² and 40 kgf/mm² and a room temperature elongation (REL) not less than 7%.

After the heat treatment, each of the electrolytic copper foils of the exemplary examples 1 to 5 has a tensile strength after heat treatment (ATS) between 25 kgf/mm² and 35 kgf/mm² and an elongation after heat treatment (AEL) not less than 9.5%. It is worth mentioning that elongation of each of the electrolytic copper foils of the exemplary examples 1 to 5 was significantly higher than that of the comparative examples 1 to 3 before and after the heat treatment. Obviously, the electrolytic copper foils of the exemplary examples 1 to 5 have better elongation performance compared to that of the comparative examples 1 to 3.

Further, the concentrations of the addition agents such as gelatin concentration, MPS concentration, and HEC concentration of the exemplary examples 1 to 5 were much lower than the concentrations of the addition agents of the comparative examples 1 and 2. The reason why the electrolytic copper foil having high REL and AEL can be produced under low additive concentration is that the above various process conditions (i.e. selection of addition agents, selection of gelatin molecular weight, adjustment of chloride ions concentration, and adjustment of copper electrolytic solution temperature) are properly matched to each other.

Therefore, the crystal orientations of the electrolytic copper foils of the exemplary examples 1 to 5 are mainly the (200) crystal face and the (111) crystal face, so that the electrolytic copper foils have high elongation. In other words, the electrolytic copper foils of the exemplary examples 1 to 5 can still have good elongation at low addition agent concentrations by the above-described process conditions, thereby greatly reducing the cost of usage of the addition agent and greatly improving the poor production process problem.

In addition, the importance of selection of gelatin molecular weight can be seen from the comparative example 3 of Table 2. More specifically, although the process conditions (i.e. a temperature of the copper electrolytic solution, the concentration of the chloride ion, and the concentration of various additives) of the comparative example 3 were close to the process conditions of the exemplary example 1, the gelatin molecular weight selected in the comparative example 3 was too large (greater than 10,000). Therefore, the electrolytic copper foil obtained by the process conditions of the comparative example 3 had the diffraction peak intensity I(200) of the (200) crystal face which could not approach the diffraction peak intensity I(111) of the (111) crystal face. Moreover, since the ratio of I(200)/I(111) was less than 0.5, the performance of REL and AEL of the electrolytic copper foil of the comparative example 3 was not as good as that of the exemplary example 1.

Lithium Ion Secondary Battery

Figure 4:
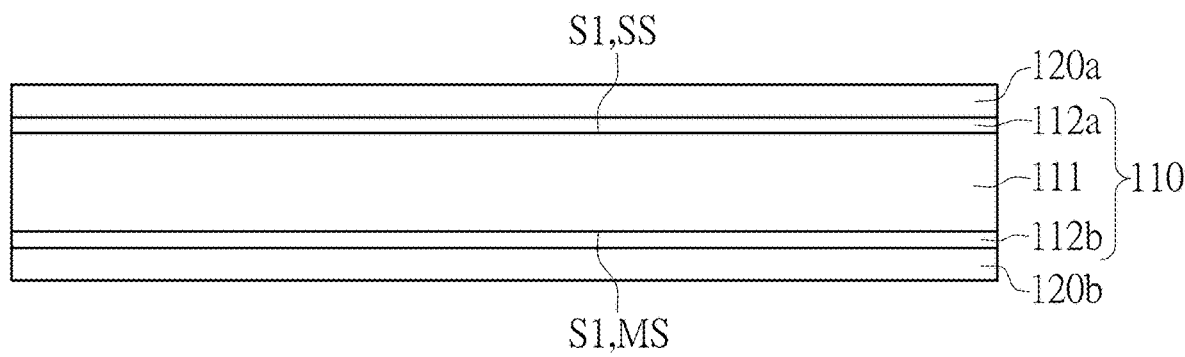
FIG. 4 is a side elevational view of a negative electrode according to the embodiment of the present disclosure.
Figure 5:
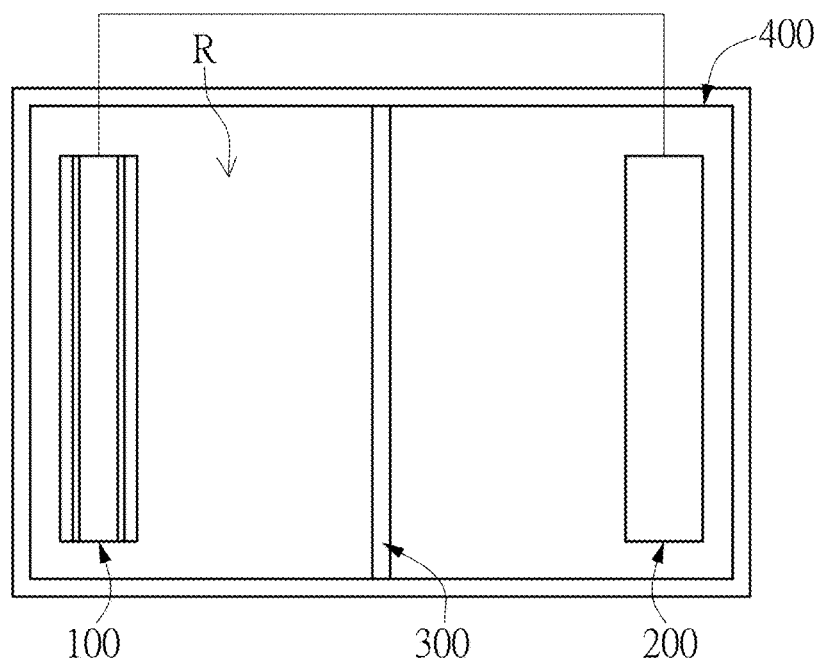
FIG. 5 is a schematic view of a lithium ion secondary battery according to the embodiment of the present disclosure.

Referring to FIG. 4 and FIG. 5, FIG. 4 is a side elevational view of a negative electrode according to an embodiment of the present disclosure, and FIG. 5 is a schematic view of a lithium ion secondary battery according to an embodiment of the present disclosure. In the present embodiment, the above-described electrolytic copper foil 110 can be applied to a lithium ion secondary battery E, and can be used as a material of the negative electrode 100 of the lithium ion secondary battery E.

The lithium ion secondary battery E described above may be an energy storage type, a power type, or an energy type storage battery, and may be applied as a battery for a vehicle. The above-described vehicle battery can be applied to an electric vehicle, an electric bus, a hybrid electric vehicle, etc., but the present disclosure is not limited thereto.

Further referring to FIG. 5, the lithium ion secondary battery E includes a negative electrode 100 (also called anode), a positive electrode 200 (also called cathode), an isolation film 300, and an electrolytic tank 400. The electrolytic tank 400 has an accommodating space R for accommodating an electrolytic solution (not shown). The negative electrode 100 is disposed in the accommodating space R of the electrolytic tank 400. The positive electrode 200 is also disposed in the accommodating space R of the electrolytic tank 400 and spaced apart from the negative electrode 100. The isolation film 300 is disposed between the negative electrode 100 and the positive electrode 200. When the electrolytic tank 400 accommodates the electrolytic solution, the electrolytic solution may provide an environment for lithium ions to move between the negative electrode 100 and the positive electrode 200, and the isolation film 300 may electrically insulate the positive electrode 200 and the negative electrode 100. Therefore, occurrences of a short circuit inside the lithium ion secondary battery E can be effectively avoided.

The positive electrode 200 of the lithium ion secondary battery E described above includes an aluminum foil and a positive electrode active material (not shown) coated on the aluminum foil, but the present disclosure is not limited thereto.

Further referring to FIG. 4, the negative electrode 100 of the lithium ion secondary battery E includes the electrolytic copper foil 110, a first active material layer 120a, and a second active material layer 120b. The first active material layer 120a and the second active material layer 120b are respectively disposed on two opposite surfaces of the electrolytic copper foil 110. More specifically, the first active material layer 120a is disposed on a surface of the first oxidation resistant layer 112a away from the raw foil layer 111, and the second active material layer 120b is disposed on a surface of the second oxidation resistant layer away from the raw foil layer 111.

It should be noted that in the present embodiment, FIG. 4 and FIG. 5 are exemplified by the fact that the first active material layer 120a and the second active material layer 120b are respectively disposed on the two opposite surfaces of the electrolytic copper foil 110, but the present disclosure is not limited thereto. In another embodiment of the present disclosure (not shown), the anode 100 of the lithium ion secondary battery E may also include only one of the first active material layer 120a and the second active material layer 120b as its active material layer.

The first active material layer 120a and the second active material layer 120b may each include at least one active material as a negative electrode active material. The active material is at least one element selected from the group consisting of carbon, silicon, a metal containing germanium, tin, lithium, zinc, magnesium, cadmium, cerium, nickel, iron, an alloy of the metal, an oxide of the metal, and a composition of the metal and carbon.

Advantageous Effects

The advantageous effects of the present disclosure are that the electrolytic copper foil 110 can have high elongation, low production cost, and high production stability through the technical features of "in the X-ray diffraction spectrum of the first surface S1 of the electrolytic copper foil 110, a ratio of the diffraction peak intensity I(200) of the (200) crystal face of the first surface S1 relative to the diffraction peak intensity I(111) of the (111) crystal face of the first surface S1 is between 0.5 and 2.0", "in the X-ray diffraction spectrum of the second surface S2 of the electrolytic copper foil 110, a ratio of the diffraction peak intensity I(200) of the (200) crystal face of the second surface S2 relative to the diffraction peak intensity I(111) of the (111) crystal face of the second surface S2 is also between 0.5 to 2.0", "a copper electrolytic solution includes at least one addition agent", and "based on the total weight of the copper electrolytic solution, a concentration of the at least one addition agent is not more than 12 ppm".

Further, since the crystal orientations of the electrolytic copper foil 110 of the present embodiment are mainly the (200) crystal face and the (111) crystal face, a slip phenomenon between the plurality of crystal grains in the electrolytic copper foil 110 is likely to occur. Therefore, the electrolytic copper foil 110 has high elongation. In other words, since the crystal structure of the electrolytic copper foil 110 of the present embodiment is a bulk crystal structure, the electrolytic copper foil 110 has high elongation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for producing an electrolytic copper foil, comprising:
preparing a copper electrolytic solution including at least one addition agent; wherein based on a total weight of the copper electrolytic solution, a concentration of the at least one addition agent is not more than 12 ppm; and
performing an electroplating step including: electrolyzing the copper electrolytic solution to form a raw foil layer on a rotating electrode drum;
wherein the raw foil layer has a first surface and a second surface opposite to the first surface;
wherein in an X-ray diffraction spectrum of the first surface, a ratio of a diffraction peak intensity I(200) of a (200) crystal face of the first surface relative to a diffraction peak intensity I(111) of a (111) crystal face of the first surface is between 0.5 and 2.0;
wherein in an X-ray diffraction spectrum of the second surface, a ratio of a diffraction peak intensity I(200) of a (200) crystal face of the second surface relative to a diffraction peak intensity I(111) of a (111) crystal face of the second surface is between 0.5 and 2.0;
wherein the first surface is a surface that is in contact with the rotating electrode drum and is defined as an S surface; and the second surface is a surface that is opposite to the S surface and is defined as an M surface; wherein in an X-ray diffraction spectrum of the S surface, a ratio of a diffraction peak intensity I(200) of a (200) crystal face of the S surface relative to a diffraction peak intensity I(111) of a (111) crystal face of the S surface is defined as a first diffraction peak intensity ratio; and in an X-ray diffraction spectrum of the M surface, a ratio of a diffraction peak intensity I(200) of a (200) crystal face of the M surface relative to a diffraction peak intensity I(111) of a (111) crystal face of the M surface is defined as a second diffraction peak intensity ratio; wherein the first diffraction peak intensity ratio is less than the second diffraction peak intensity ratio; and
wherein an absolute value of a difference between the first diffraction peak intensity ratio and the second diffraction peak intensity ratio is not less than 0.01 and not more than 0.30.

2. The method according to claim 1, wherein the at least one addition agent includes a first addition agent, a second addition agent, and a third addition agent; wherein the first addition agent is a gelatin, the second addition agent is sulfonic acid or sulfonate which has a sulfur compound, and the third addition agent is a nonionic water soluble polymer.

3. The method according to claim 2, wherein in the copper electrolytic solution, a sum of concentrations of the first addition agent, the second addition agent, and the third addition agent is not more than 12 ppm.

4. The method according to claim 2, wherein the gelatin has a weight average molecular weight between 1,000 and 5,000.

5. The method according to claim 1, further comprising:
performing an anti-oxidation treatment step which includes: forming a first oxidation resistant layer on the first surface of the raw foil layer, and forming a second oxidation resistant layer on the second surface of the raw foil layer, such that the raw foil layer, the first oxidation resistant layer, and the second oxidation resistant layer are collectively formed into an electrolytic copper foil;
wherein based on a total weight of the electrolytic copper foil, each of the first oxidation resistant layer and the second oxidation resistant layer includes a non-copper metal element in an amount ranging from 1 ppm to 1,000 ppm; wherein the non-copper metal element is at least one element selected from the group consisting of chromium, zinc, nickel, molybdenum, manganese, phosphorus, and combinations thereof.

* * * * *